United States Patent

(12) United States Patent
Wingard

(10) Patent No.: US 6,752,336 B1
(45) Date of Patent: Jun. 22, 2004

(54) CARPET RECYCLING METHOD

(75) Inventor: Donald Allen Wingard, Scranton, SC (US)

(73) Assignee: Wellman, Inc., Shrewsbury, NJ (US)

(*) Notice: Subject to any disclaimer, the term of this patent is extended or adjusted under 35 U.S.C. 154(b) by 17 days.

(21) Appl. No.: 10/163,449

(22) Filed: Jun. 5, 2002

(51) Int. Cl.$^7$ .............................................. B02C 19/12
(52) U.S. Cl. ...................... 241/20; 241/21; 241/24.19
(58) Field of Search ...................... 241/DIG. 38, 21, 241/24.19, 19, 20

(56) References Cited

U.S. PATENT DOCUMENTS

| 5,230,473 A | 7/1993 | Hagguist et al. |
| 5,497,949 A | 3/1996 | Sharer |
| 5,518,188 A | 5/1996 | Sharer |
| 5,535,945 A | 7/1996 | Sferrazza et al. |
| 5,598,980 A | 2/1997 | Dilly-Louis et al. |
| 5,722,603 A | 3/1998 | Costello et al. |
| 5,908,164 A | 6/1999 | Robinson et al. |
| 6,029,916 A | 2/2000 | White |
| 6,059,207 A | 5/2000 | Costello et al. |
| 6,126,096 A | * 10/2000 | Robinson et al. ............. 241/19 |
| 6,182,913 B1 | 2/2001 | Howe et al. |
| 6,250,575 B1 | 6/2001 | White |
| 6,379,489 B1 | * 6/2002 | Goulet et al. ................ 241/21 |
| 6,398,138 B1 | * 6/2002 | Robinson et al. ............. 241/5 |

FOREIGN PATENT DOCUMENTS

| DE | 33 43 788 A1 | 6/1985 |
| FR | 2 301 362 | 2/1976 |
| WO | WO 94/01219 A1 | 1/1994 |

OTHER PUBLICATIONS

Dr. Roger A. Smith and Dr. Brian E. Gracon; *Polyamide 66 and 6 Chemical Recycling*; Recycle '95; Feb. 1995; 17 pages total; E.I. DuPont De Nemours & Co., Inc., Wilmington, Delaware.

* cited by examiner

Primary Examiner—Allen Ostrager
Assistant Examiner—Jimmy Nguyen
(74) Attorney, Agent, or Firm—Summa & Allan, P.A.

(57) ABSTRACT

The invention is an efficient and cost-effective method of recovering carpet materials by reducing carpet into size-reduced fibers, slurrying the size-reduced fibers in a liquid medium, and then selectively separating the size-reduced fibers in a centrifuge. The present method is particularly appropriate for recovering nylon or polyester face fibers from post-industrial, pre-consumer carpet waste.

44 Claims, 2 Drawing Sheets

CARPET RECYCLING METHOD

FIELD OF THE INVENTION

The invention relates to the efficient and cost-effective recovery of component materials from carpet waste.

BACKGROUND OF THE INVENTION

Current processes for recovering carpet waste components often require complicated and expensive integration of numerous unit operations, and yet achieve modest results. In particular, efforts to recover materials from carpet waste most often subject a feedstock of dirty, post-consumer, whole carpet to one of several separation techniques. Unfortunately, some materials and impurities present in used carpet (e.g., some adhesives and dirt) necessitate numerous washing and screening steps, which impede the effectiveness of most separation processes. Reduced efficiency frequently renders recovery of the desired components costly, and thus impractical.

Various mechanical separation processes have been attempted to separate and recover materials from carpet waste. One common method is hot-wire skimming or shearing nylon pile from the carpet surface. This approach, however, recovers only the face fiber that extends above the carpet backing. Consequently, it is not an effective method for recovering the significant portion of face fiber found below the carpet backing.

Other processes attempt to separate carpet components by first reducing the size of the carpet waste and thereafter separating the size-reduced component materials, such as via elutriators, centrifuges, hydrocyclones, and settlers. Each kind of apparatus carries its own advantages and disadvantages, but as of yet none has been employed in a way that provides cost-effective recycling of carpet waste.

Carpet manufacturers are continually challenged by the generation of post-industrial carpet waste. Each year, large quantities of such carpet waste are simply landfilled. Disposing of carpet waste in this way is not only expensive, but also runs counter to increasing corporate emphasis on environmental stewardship. In short, merely discarding carpet waste precludes recycling the useful materials present in carpet waste.

Consequently, the need exists for an efficient and cost-effective method to separate and recover the components of carpet waste such that the recovered materials are sufficiently pure to facilitate immediate recycling.

SUMMARY OF THE INVENTION

Therefore, it is an object of the present invention to provide an efficient and cost-effective method for recovering component materials from carpet waste.

It is further an object of the present invention to provide an efficient and cost-effective method for recovering component materials from post-industrial, pre-consumer waste.

It is further an object of the present invention to provide a cost-effective method for recovering the component materials of carpet waste that includes only polymer face fiber and olefin fabric backing.

It is further an object of the present invention to selectively separate the components of pre-consumer carpet waste in such a manner as to result in an output stream of polymer face fiber that is pure enough to facilitate direct processing of the recovered face fiber.

It is yet another object of the present invention to separate the components of pre-consumer carpet waste in such a manner as to result in an output stream of olefin backing fiber that is pure enough to facilitate direct processing of the recovered olefin backing fiber.

It is further an object of the present invention to lessen the environmental impact of disposing of carpet waste in landfills by providing an economically-viable recycling method.

The foregoing, as well as other objectives and advantages of the invention and the manner in which the same are accomplished, is further specified within the following detailed description and its accompanying drawings.

DETAILED DESCRIPTION OF THE INVENTION

Figure 1:
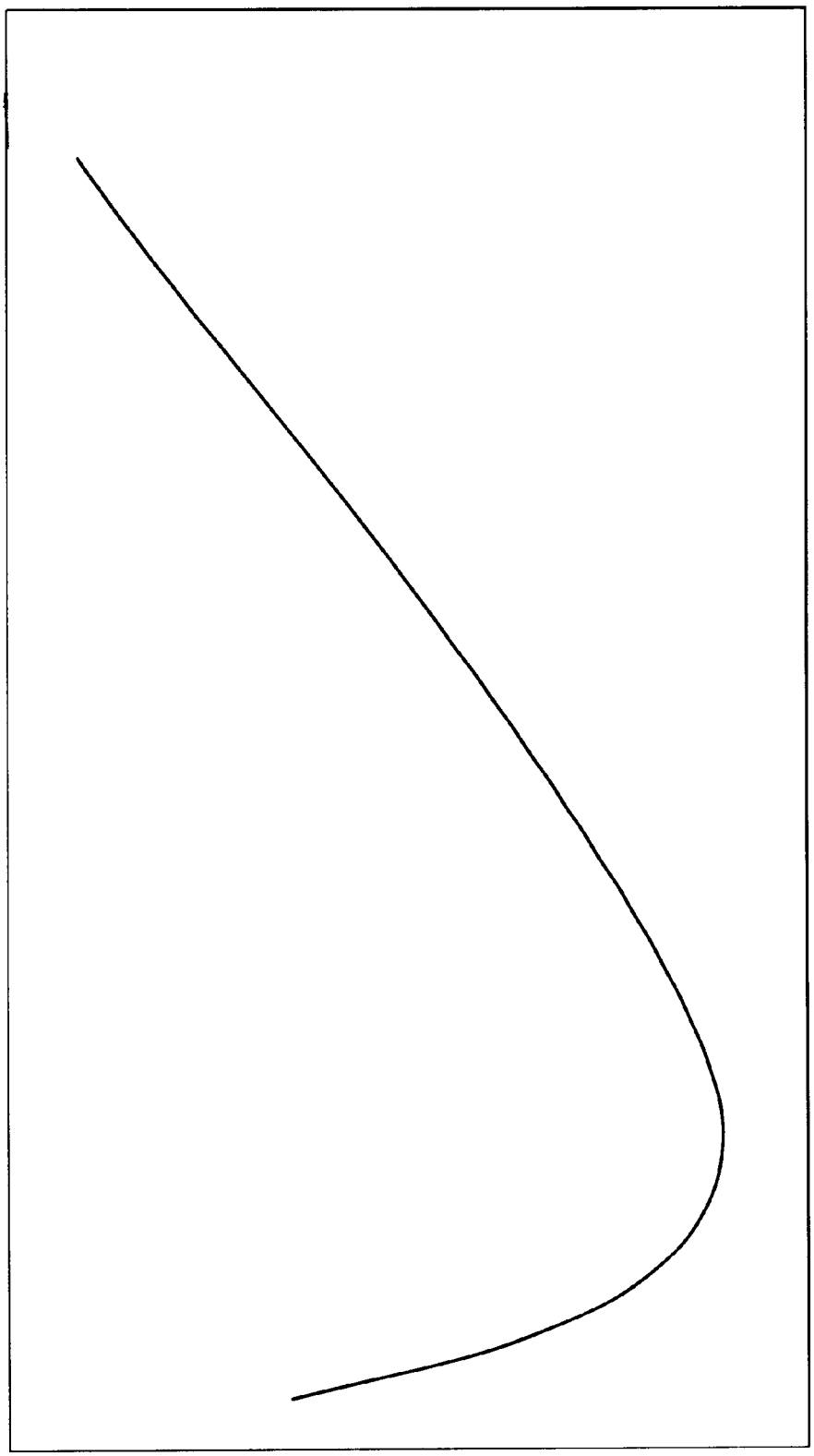
FIG. 1 qualitatively describes carpet separation costs as a function of fiber size.

The present invention is an improved method of reclaiming carpet materials from carpet waste. Recovery of the carpet materials is accomplished by reducing the carpet into size-reduced fibers, slurrying the size-reduced fibers in an aqueous liquid medium, and then selectively separating the size-reduced fibers in a centrifuge.

In one embodiment of the invention, the method uses a carpet feedstock that includes only face fibers having a density greater than 1.0 g/cm$^3$ (e.g., nylon fibers or polyester fibers) and an olefin fabric backing that includes fibers having a density less than 1.0 g/cm$^3$ (e.g., polypropylene fibers). According to this embodiment, the carpet is reduced into size-reduced fibers (i.e., size-reduced face fibers and size-reduced olefin backing fibers). Then, the size-reduced fibers are slurried in an aqueous liquid medium. Finally, the size-reduced fibers are centrifuged to advantageously separate the face fibers from the olefin fabric backing (i.e., the olefin backing fibers).

The preferred carpet feedstock includes face fibers of either nylon, which has a density of about 1.14 g/cm$^3$, or polyester, which has a density of about 1.33 g/cm$^3$, and an olefin fabric backing that is formed of polypropylene fibers, which have a density of between about 0.91 and 0.95 g/cm$^3$. The preferred carpet feedstock includes only an olefin fabric backing-typically a woven fabric-in which loops of polymer face fiber are mechanically secured without the use of adhesives.

As used herein, the term "olefin" characterizes a synthetic polymer whose repeating unit is derived from a monomer having a carbon-carbon double bond (e.g., ethylene and polypropylene).

While post-consumer carpet waste is a feedstock within the scope of the invention, the preferred feedstock is pre-consumer carpet waste. As used herein, the term "pre-consumer carpet waste" means carpet that has not been installed for consumer use. Pre-consumer carpet includes, without limitation, carpet manufacturer trimmings, rejects, and overruns.

The carpet feedstock is typically in rolls or otherwise oversized scraps. Consequently, to effect centrifugal separation, the carpet feedstock is subjected to a mechanical size-reduction process to break down the carpet into its fibrous components (i.e., face fibers and olefin backing fibers). Size reduction may be effected by first shredding (e.g., ripping in a shredder) and thereafter granulating the carpet feedstock. Carpet size-reduction, which is preferably a dry process, may be either a batch or continuous process.

Carpet shredding may be achieved using conventional shredding equipment. The subsequent granulating of the shredded carpet is preferably achieved by subjecting it to a rotating blade classifier, which is characterized by rotating knives that integrate with stationary bed knives. Those having ordinary skill in the art will be familiar with additional means to disintegrate the carpet waste into fibrous components and such means are within the scope of the invention. See Perry and Green, Perry's Chemical Engineers' Handbook § 20 (7th ed. 1997).

The carpet feedstock will typically include substantially more face fiber than olefin fabric backing. Indeed, a preferred carpet feedstock includes about 90 weight percent face fibers and about ten weight percent olefin fabric backing. Those having ordinary skill in the art will appreciate that olefin backing fabrics tend to granulate differently than face fibers. In particular, the size-reduced olefin backing fibers are generally longer and coarser than the size-reduced face fibers. Consequently, the size-reduced fiber may be adequately characterized by describing the face fiber fraction.

The mean length of the size-reduced face fibers is preferably less than about 15 mm, more preferably less than about 10 mm, and most preferably between about 3 mm and 7 mm (e.g., 5 mm). It will be appreciated by those of ordinary skill in the art that the size-reduced face fibers have a distribution of sizes, including fiber fines. Accordingly, as used herein, mean length refers to number-average length, excluding fines that are less than 0.025 inch (i.e., about 0.6 mm). Likewise, the median length of the size-reduced face fibers, excluding fines that are less than 0.025 inch, is preferably less than about 15 mm, more preferably less than about 10 mm, and most preferably between about 3 and 7 mm (e.g., 5 mm).

The desired size-reduction is preferably achieved by screening the size-reduced fibers during the size-reduction process. For example, it is expected that forcing the size-reduced fibers through a screen having an effective screen size of between about 3 mm and 20 mm should yield size-reduced face fibers having a mean length of less than about 15 mm. Likewise, it is expected that screens having an effective screen size of between about 5 mm and 15 mm, and preferably an effective screen size of between about 7 mm and 10 mm, should yield size-reduced face fibers having a mean length of less than about 10 mm, and preferably between about 3 mm and 7 mm, respectively. As noted, the size-reduced olefin backing fibers will tend to be somewhat longer than the size-reduced face fibers.

As used herein, the term "effective screen size" describes the diameter of the openings in screens having uniform circular screen apertures, as is preferred in practicing the present invention. Those having ordinary skill in the art will appreciate that the term "effective screen size" is intended also to characterize screens having other kinds of aperture shapes based on performance that corresponds to that of screens having uniform circular screen apertures of a particular diameter. For example, a screen having non-circular openings has an effective screen size of 10 mm if it performs like a screen having uniform, 10-mm diameter, circular screen apertures.

Those having ordinary skill in the art will appreciate that the costs associated with recovering carpet materials is affected by fiber size (i.e., there is an inverse relationship between fiber size-reduction costs and centrifuging costs). In this regard, reducing expenditures associated with fiber size reduction will generally increase expenditures associated with centrifuging the relatively longer size-reduced fibers. Conversely, increasing expenditures associated with fiber size-reduction will generally decrease expenditures associated with centrifuging the relatively shorter size-reduced fibers. FIG. 1 qualitatively describes carpet separation costs, including fiber size-reduction costs and centrifuging costs, as a function of fiber size.

The size-reduced fibers and an aqueous liquid medium—mostly water—are continuously introduced to a mixing tank to form a size-reduced fiber slurry. The liquid medium preferably has a specific gravity of about 1.0. The solution (i.e., the fiber slurry) preferably contains less than ten weight percent size-reduced fibers, more preferably less than five weight percent size-reduced fibers, and most preferably between about one and two weight percent size-reduced fibers.

The fiber slurry may further contain a defoamer additive, such as Rhone-Poulenc's ANTROX L61. Defoamer helps to reduce the formation of foam, which is often caused by residual sizes and finishes and which can adversely affect the mixing of the size-reduced fibers and the aqueous liquid medium. The fiber slurry may also contain other additives, such as detergents. A suitable detergent, which improves fiber wetting, is Oakite's OAKITE RC7A. Additives generally constitute less than about 0.1 weight percent of the size-reduced fiber slurry.

The size-reduced fiber slurry is fed (e.g., pumped) to a centrifuge, preferably a single-cone centrifuge, to separate the face fiber from the olefin backing fibers. As will be understood by those with ordinary skill in the art, a single-cone centrifuge may be used to separate two differing materials based on their respective densities. A single-cone centrifuge suitable for use with the present invention is Alfa Laval's P5400 model. Effective separation of the carpet components occurs when the centrifuge is operated at about 3000–5000 RPMs, thereby subjecting the size-reduced fiber slurry to a G-force of at least 500 (i.e., 500 times the acceleration of standard gravity, or about 5000 m/s$^2$). In contrast, a simple sink-float density separation would subject the size-reduced fiber slurry to the acceleration of standard gravity (i.e., 9.81 m/s$^2$).

This continuous centrifugal separation yields two output streams, a relatively dry first output stream of mostly face fibers and a wet second output stream of mostly water and olefin backing fibers. In particular, on a dry basis, at least about 98 percent of the first output stream is face fibers. Similarly, on a dry basis, at least about 96 percent of the second output stream is olefin backing fibers. On a wet basis, the first output stream is at least about 85 weight percent solids, whereas the second output stream is only about five weight percent solids. (Where a double-cone centrifuge is employed, both the first output stream and the second output stream are dewatered to at least about 85 weight percent solids.) It will be appreciated by those of ordinary skill in the art that the extent of separation and recovery of carpet components is affected by the composition and quality of the feedstock.

The recovered face fibers may be melt-extruded and pelletized, or melt-extruded and spun into filaments. Preferably, the recovered face fibers are dried to a higher solid content before melt-extrusion. Pelletized nylon and polyester are especially useful for engineering plastic or resin. Likewise, dewatered, recovered olefin backing fibers may be melt-extruded into pellets or filaments.

EXAMPLE

Figure 2:
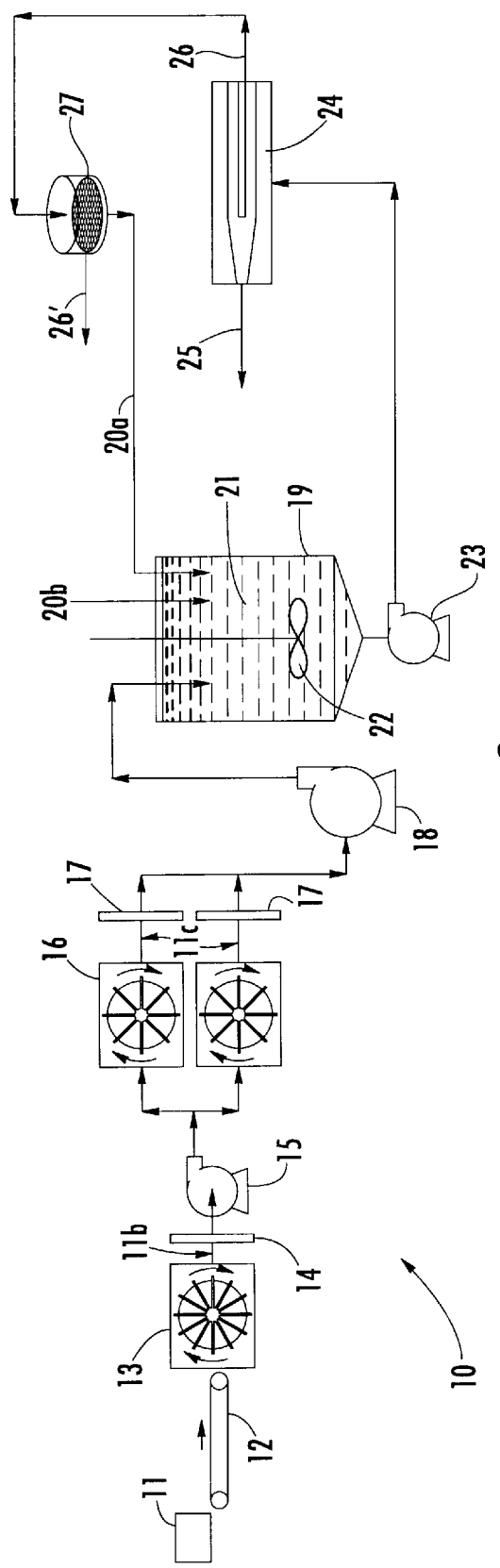
FIG. 2 schematically illustrates a representative embodiment of the present invention.

FIG. 2 depicts an exemplary process 10 for recovering nylon face fibers from a pre-consumer carpet that includes about 90 weight percent nylon face fibers and about ten weight percent polypropylene fabric backing fibers.

The carpet feedstock 11 is delivered via a conveyor belt system 12 to a shredder 13. The shredder 13 effectively rips the carpet feedstock 11 into coarse carpet scraps 11b, which are screened by a one-inch screen 14 to ensure that the initial target size reduction is achieved. The screen 14 is preferably integrated into the shredder 13.

The shredded carpet scraps 11b are then passed via a blower 15 to granulators 16, which further reduce the carpet scraps 11b into fibrous components 11c (i.e., granulated fibers) of a size suitable for subsequent centrifugal separation. The desired fiber size is achieved by passing the granulated fibers 11c through screens 17 having an effective screen size of 5/16 inch (i.e., about 8 mm). The screens 17 are preferably integrated into the granulators 16. Subjecting the fibers 11c to the screens 17 yields granulated fibers 11c with a mean length of about 5 mm.

The granulated fibers 11c are then passed via a blower 18 to a mix tank 19. There, the granulated fibers 11c are combined with an aqueous liquid media, which includes both recycled water 20a and freshwater make-up 20b, to form a fiber slurry 21. The fiber slurry 21, which is continuously mixed within mix tank 19 by an agitator 22, contains approximately two weight percent size-reduced fibers.

The fiber slurry 21 is transported by a pump 23 to a single-cone centrifuge 24 for density-separation of the nylon face fibers, which have a density of about 1.14 g/cm$^3$, from the polypropylene fabric backing fibers, which have a density of between about 0.91 and 0.95 g/cm$^3$. The centrifuge is operated between about 3000 and 5000 RPMs to yield a mostly dry first output stream 25 of nylon face fibers and a second output stream 26 of polypropylene fabric backing fibers and water. On a wet basis, the first output stream 25 is over 85 weight percent solids, whereas the second output stream 26 is less than about five weight percent solids. On a dry basis, the first output stream 25 is about 98 percent pure nylon fibers and the second output stream 26 is about 96 percent pure polypropylene fibers.

The recovered nylon in the first output stream 25 is suitable for further processing, such as melt-extrusion into pellets or filaments. The second output stream 26 is dewatered via a vibrating screen 27 to separate the polypropylene fibers 26' from the water 20a. The recovered polypropylene 26' is suitable for melt-extrusion into pellets or filaments. As noted, the water 20a is recycled into the mix tank 19.

In accordance with the foregoing, there are preferred embodiments of the invention. One preferred embodiment includes reducing (e.g., shredding and granulating) a pre-consumer carpet that includes only nylon face fibers and polypropylene fabric backing fibers such that the resulting size-reduced nylon have a mean length of less than about 15 mm, preferably less than about 10 mm, and most preferably between about 3 and 7 mm. The method further includes slurrying the size-reduced nylon and polypropylene fibers in a liquid medium. Preferably, the liquid medium is water, perhaps augmented with defoamer or detergent, or both. The method further includes centrifuging the size-reduced nylon face fibers and the polypropylene fabric backing fibers in a single-cone centrifuge to separate the size-reduced fibers into a first output stream and a second output stream. This centrifuging step yields, on a dry basis (i.e., excluding water), a first output stream that is at least about 98 percent nylon face fibers and a second output stream that is at least about 96 percent polypropylene fabric backing fibers.

Another preferred embodiment includes reducing a carpet, which includes only face fibers having a density greater than 1.0 g/cm$^3$ and an olefin fabric backing formed of fibers having a density less than 1.0 g/cm$^3$, into size-reduced fibers (i.e., both size-reduced face fibers and size-reduced olefin backing fibers). The method further includes passing the size-reduced fibers through a screen having an effective screen size of between about 5 and 15 mm-preferably between about 7 and 10 mm-and then slurrying the size-reduced fibers in water, which is preferably treated with defoamer or detergent, or both. Finally, the method includes centrifuging the size-reduced fibers in a single-cone centrifuge to separate the face fibers from the olefin fabric backing (i.e., the olefin backing fibers).

Yet another preferred embodiment is a method for recovering face fibers from carpet materials that minimizes the required unit operations. This embodiment includes reducing a carpet, which includes only face fibers having a density greater than 1.0 g/cm$^3$ and fabric backing having a density less than 1.0 g/cm$^3$, into size-reduced fibers and immediately passing the size-reduced fibers through a screen having an effective screen size of between about 5 mm and 15 mm. The method further includes slurrying the size-reduced fibers in an aqueous liquid medium before centrifuging in a centrifuge, preferably a single-cone centrifuge, to thereby separate the size-reduced fibers into a first output stream and a second output stream. Preferably, on a dry basis, at least about 98 percent of the first output stream is face fibers.

In the specification and drawings typical embodiments of the invention have been disclosed. Specific terms have been used only in a generic and descriptive sense, and not for purposes of limitation. The scope of the invention is set forth in the following claims.

What is claimed is:

1. A method of recovering carpet materials, comprising:
providing a carpet consisting of face fibers having a density greater than 1.0 g/cm$^3$ and olefin fabric backing having a density less than 1.0 g/cm$^3$;
reducing the carpet into size-reduced face fibers and size-reduced olefin backing fibers;
then slurrying the size-reduced fibers in an aqueous liquid medium; and
centrifuging the size-reduced fibers in a centrifuge to separate the face fibers from the olefin backing fibers.

2. A method of recovering carpet materials according to claim 1, wherein the face fibers consist of nylon fibers.

3. A method of recovering carpet materials according to claim 1, wherein the face fibers consist of polyester fibers.

4. A method of recovering carpet materials according to claim 1, wherein the olefin fabric backing consists of polypropylene.

5. A method of recovering carpet materials according to claim 1, further comprising passing the size-reduced fibers through a screen having an effective screen size of between about 3 mm and 20 mm before the step of slurrying the size-reduced fibers in an aqueous liquid medium.

6. A method of recovering carpet materials according to claim 1, further comprising passing the size-reduced fibers through a screen having an effective screen size of between about 5 mm and 15 mm before the step of slurrying the size-reduced fibers in an aqueous liquid medium.

7. A method of recovering carpet materials according to claim 1, further comprising passing the size-reduced fibers through a screen having an effective screen size of between about 7 mm and 10 mm before the step of slurrying the size-reduced fibers in an aqueous liquid medium.

8. A method of recovering carpet materials according to claim 1, wherein the size-reduced face fibers have a mean length of less than about 15 mm.

9. A method of recovering carpet materials according to claim 1, wherein the size-reduced face fibers have a mean length of less than about 10 mm.

10. A method of recovering carpet materials according to claim 1, wherein the size-reduced face fibers have a mean length of between about 3 mm and 7 mm.

11. A method of recovering carpet materials according to claim 1, wherein the size-reduced face fibers have a median length of less than about 15 mm.

12. A method of recovering carpet materials according to claim 1, wherein the size-reduced face fibers have a median length of less than about 10 mm.

13. A method of recovering carpet materials according to claim 1, wherein the aqueous liquid medium consists essentially of water.

14. A method of recovering carpet materials according to claim 1, wherein the step of slurrying the size-reduced fibers yields a solution that is less than about 10 weight percent size-reduced fibers.

15. A method of recovering carpet materials according to claim 1, wherein the step of slurrying the size-reduced fibers yields a solution that is less than about 5 weight percent size-reduced fibers.

16. A method of recovering carpet materials according to claim 1, wherein the step of slurrying the size-reduced fibers yields a solution that is between about 1 and 2 weight percent size-reduced fibers.

17. A method of recovering carpet materials according to claim 1, wherein the centrifuging step comprises centrifuging the size-reduced fibers to yield a first output stream and a second output stream.

18. A method of recovering carpet materials according to claim 17, wherein the solids fraction of the first output stream consists essentially of face fibers and the solids fraction of the second output stream consists essentially of olefin backing fibers.

19. A method of recovering carpet materials according to claim 17, wherein, on a dry basis, at least about 98 percent of the first output stream is face fibers.

20. A method of recovering carpet materials according to claim 17, wherein, on a dry basis, at least about 96 percent of the second output stream is olefin backing fibers.

21. A method of recovering carpet materials according to claim 1, wherein the carpet is a pre-consumer carpet.

22. A method of recovering carpet materials, comprising:
providing a carpet consisting of face fibers and an olefin fabric backing, the face fibers having a density greater than 1.0 g/cm$^3$ and the olefin fabric backing comprising fibers having a density less than 1.0 g/cm$^3$;
reducing the carpet into size-reduced face fibers and size-reduced olefin backing fibers;
passing the size-reduced fibers through a screen having an effective screen size of between about 5 mm and 15 mm;
then slurrying the size-reduced fibers in a liquid medium consisting essentially of water; and
centrifuging the size-reduced fibers in a single-cone centrifuge to separate the face fibers from the olefin backing fibers.

23. A method of recovering carpet materials according to claim 22, wherein the face fibers consist essentially of nylon.

24. A method of recovering carpet materials according to claim 22, wherein the face fibers consist essentially of polyester.

25. A method of recovering carpet materials according to claim 22, wherein the olefin fabric backing consists essentially of polypropylene.

26. A method of recovering carpet materials according to claim 22, wherein the step of passing the size-reduced fibers through a screen comprises passing the size-reduced fibers through a screen having an effective screen size of between about 7 mm and 10 mm.

27. A method of recovering carpet materials according to claim 22, wherein the step of passing the size-reduced fibers through a screen comprises passing the size-reduced fibers through a screen having an effective screen size of about 8 mm.

28. A method of recovering carpet materials according to claim 22, wherein the liquid medium consists of water and one or both additives selected from the group consisting of defoamers and detergents.

29. A method of recovering carpet materials according to claim 22, wherein the step of slurrying the size-reduced fibers yields a solution that is less than about 10 weight percent size-reduced fibers.

30. A method of recovering carpet materials according to claim 22, wherein the step of slurrying the size-reduced fibers yields a solution that is between about 1 and 2 weight percent size-reduced fibers.

31. A method of recovering carpet materials according to claim 22, wherein the centrifuging step comprises centrifuging the size-reduced fibers to yield a first output stream and a second output stream.

32. A method of recovering carpet materials according to claim 31, wherein, on a dry basis, at least about 98 percent of the first output stream is face fibers.

33. A method of recovering carpet materials according to claim 31, wherein, on a dry basis, at least about 96 percent of the second output stream is olefin backing fibers.

34. A method of recovering carpet materials according to claim 31, wherein, on a dry basis, at least about 98 percent of the first output stream is face fibers and at least about 96 percent of the second output stream is olefin backing fibers.

35. A method of recovering carpet materials according to claim 22, wherein the carpet is a pre-consumer carpet.

36. A method of recovering carpet materials, comprising:
providing a pre-consumer carpet consisting of nylon face fibers and polypropylene fabric backing fibers;
reducing the carpet into size-reduced nylon face fibers having a mean length of less than about 15 mm and size-reduced polypropylene fabric backing fibers;
slurrying the size-reduced fibers in a liquid medium consisting essentially of water; and
centrifuging the size-reduced fibers in a single-cone centrifuge to separate the size-reduced fibers into a first output stream and a second output stream, wherein, on a dry basis, at least about 98 percent of the first output stream is nylon face fibers, and wherein, on a dry basis, at least about 96 percent of the second output stream is polypropylene fabric backing fibers.

37. A method of recovering carpet materials according to claim 36, wherein the size-reduced nylon face fibers have a mean length of less than about 10 mm.

38. A method of recovering carpet materials according to claim 36, wherein the size-reduced nylon face fibers have a mean length between about 3 mm and 7 mm.

39. A method of recovering carpet materials according to claim 36, wherein, on a wet basis, the first output stream is at least about 85 weight percent solids.

40. A method for recovering face fibers from carpet materials, consisting essentially of the following steps:
- providing a carpet consisting of face fibers having a density greater than 1.0 g/cm$^3$ and fabric backing having a density less than 1.0 g/cm$^3$;
- reducing the carpet into size-reduced fibers;
- passing the size-reduced fibers through a screen having an effective screen size of between about 5 mm and 15 mm;
- then slurrying the size-reduced fibers in an aqueous liquid medium; and
- centrifuging the size-reduced fibers in a centrifuge to separate the size-reduced fibers into a first output stream and a second output stream, wherein, on a dry basis, at least about 98 percent of the first output stream is face fibers.

41. A method according to claim 40, wherein the face fibers consist essentially of nylon.

42. A method of recovering carpet materials according to claim 40, wherein the face fibers consist essentially of polyester.

43. A method of recovering carpet materials according to claim 40, wherein the step of passing the size-reduced fibers through a screen comprises passing the size-reduced fibers through a screen having an effective screen size of between about 7 mm and 10 mm.

44. A method of recovering carpet materials according to claim 40, wherein the aqueous liquid medium consists of either water or water and one or both additives selected from the group consisting of defoamers and detergents.

* * * * *